United States Patent [19]

McPherson et al.

[11] Patent Number: 4,952,267

[45] Date of Patent: Aug. 28, 1990

[54] METHOD AND AN APPARATUS FOR BONDING TOGETHER AT LEAST TWO RUNNING LENGTHS OF MATERIAL

[75] Inventors: Malcolm McPherson, Poole-Dorset, United Kingdom; Reinhold Ernest, Stadtbergen, Fed. Rep. of Germany

[73] Assignee: Grafotec Kotterer GmbH, Diedorf, Fed. Rep. of Germany

[21] Appl. No.: 247,341

[22] Filed: Sep. 21, 1988

[30] Foreign Application Priority Data

Oct. 23, 1987 [DE] Fed. Rep. of Germany ....... 3735856
Nov. 26, 1987 [DE] Fed. Rep. of Germany ....... 3740045

[51] Int. Cl.⁵ .............................................. B32B 31/12
[52] U.S. Cl. ..................................... 156/291; 118/302; 118/610; 156/324
[58] Field of Search ................ 118/302, 610; 156/291, 156/308.8, 324

[56] References Cited

U.S. PATENT DOCUMENTS

| | | | |
|---|---|---|---|
| 3,134,706 | 5/1964 | Alexander | 156/357 |
| 3,590,775 | 7/1971 | Barr | 118/302 X |
| 3,808,088 | 4/1974 | Knechtges et al. | 156/291 X |
| 3,821,055 | 6/1974 | Fairbanks et al. | 156/291 X |

Primary Examiner—Robert A. Dawson
Attorney, Agent, or Firm—Jones, Tullar & Cooper

[57] ABSTRACT

The invention provides a method an apparatus for joining at least two webs or running lengths of material together by means of at least one strip of adhesive applied to at least one of the webs in such a manner that the consumption of adhesive is reduced and greater reliability is achieved. This is made possible by using an adhesive having a viscosity which is close to the viscosity of water and causing the adhesive to be acted upon by a low pressure and to be filtered prior to application to the associated web.

12 Claims, 2 Drawing Sheets

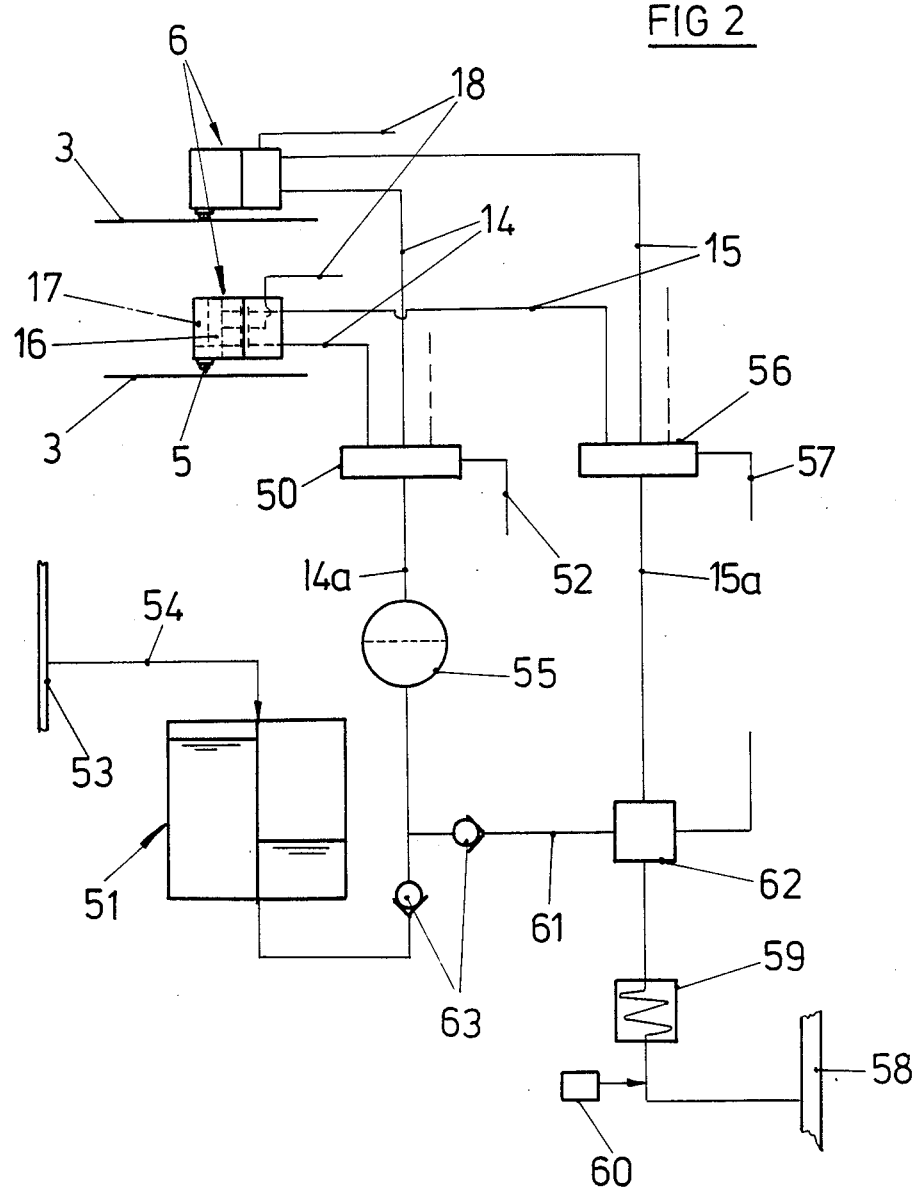

METHOD AND AN APPARATUS FOR BONDING TOGETHER AT LEAST TWO RUNNING LENGTHS OF MATERIAL

BACKGROUND OF THE INVENTION

The invention relates to a method and an apparatus for bonding together at least two running lengths of material using at least one continuous or interrupted strip of adhesive applied to at least one of the running lengths or web.

So far a comparatively viscous adhesive or glue has been used, that is to say one whose viscosity is substantially higher than that of water, normally by a factor of almost twenty. Accordingly comparatively high pressures are required for the application of the adhesive to the work. Normally pressures of the order of 5 bar are used and the consequence of this is that special pressure containers are required, into which the adhesive has to be charged. A further and more particularly significant disadvantage is that on transferring the adhesive from the commercial shipping drum into the special adhesive container particles of dirt may become mixed with the adhesive and that on the one hand there is no provision for filtering the adhesive since the filter required for this would be much too large in size and also elaborate in construction. The undesired consequence of this is on the other hand that the applying means have to have a comparatively large adhesive feed hole, this in turn leading to the disadvantage that the applied strip of adhesive is relatively thick. The result of this is accordingly not only a high rate of adhesive consumption but also fouling of the machine and in the case of the bonding together of running lengths of paper which are to be made into folded products the transverse cutter, which is used to cut by the package of running length or web may well be soiled. Accordingly as a matter of experience it is necessary to interrupt production from time to time and to clean the parts of the machinery coming into contact with the adhesive. A further factor to be considered is that owing to the absence of means for filtering the adhesive that, despite the provision of a large adhesive feed hole, blockage of the feed system is prone to occur, something that also leads to an interruption of production.

SUMMARY OF THE PRESENT INVENTION

Taking this state of the art as a starting point one object of the invention is to so improve the known apparatus that it is not only possible to avoid interruptions in production but also to ensure a lower rate of adhesive consumption and a lower rate of application thereof.

A still further objective of the invention is to make such improvements possible with simple and low-price means.

In order to achieve these and other objects of the invention appearing from the present specification, claims and drawings, the adhesive used has a viscosity similar to that of water and is subject to a low pressure and is filtered prior to its application to the web or running length of material.

The benefit produced with these measures is to be seen more particularly in that the shortcomings of known systems are avoided. Since a low-viscosity adhesive is employed with a consistence akin to that of water which is applied at a low pressure and is nevertheless filtered, it is possible to ensure that the diameter of the feed hole may be comparatively small. The low feed or application pressure and the small diameter of the feed hole together lead to an extremely thin strip of adhesive, but all the same owing to the filtration of the adhesive, blockages and trouble conditions caused thereby are not likely. At the same time one may be certain of a lower rate of adhesive consumption, this having a useful effect not only as regards the costs of material but also as regards avoidance of fouling of the machinery. A further useful effect having the same general trend is to be seen in the fact that the low-viscosity adhesive may be sprayed on, that is to say without making contact and this also has a favorable effect as regards avoiding operating troubles. Since, owing to the low viscosity of the adhesive, only a low pressure is required despite the filtration provided for, that is to say the equipment operates in the low pressure range, there is the advantage that it is no longer necessary to have special containers for the adhesive. There is thus not only no need to provide such containers but also there is no danger of fouling equipment when transferring the adhesive from the commercial shipping drum into the machine's container, this also not being without a favorable effect as regards the prevention of trouble conditions.

In accordance with a further development of the invention as an alternative to adhesive it is possible to apply a folding adjuvant liquid, preferably in the form of heated water. This applies for the uppermost web of a web stack or for all webs in as far as no application of adhesive is needed. Since for each web only adhesive or only folding adjuvant liquid is needed, the application may be performed by one and the same feed head, this leading to the useful effect that at the end of the application of adhesive flushing out the feed means with folding adjuvant liquid is possible for cleaning so that there is substantial freedom from production stoppages. Such a method of flushing may be started as soon as the web velocity has fallen to about one third of the normal value after switching off the machine, since during the time the rest of the web runs out of the machine only waste is produced. Nevertheless this makes it possible to ensure that the liquid coming out of the feed means is carried away by the web.

In order to facilitate servicing and repair operations the apparatus for performing the method of the invention comprising a feed head carried in a holder and having a nozzle supplied from a supply cord, can be so designed that the feed head has two detachable halves of which one is mounted detachably on the holder and is provided with at least one inlet port for the supply cord, and the other half has expandable components in the form of at least the nozzle, two halves of the feed head being provided with a respective supply pipe running into the feed head, each such pipe have coupling elements placed in the parting plane between the two halves which are preferably designed in the form of male and female elements able to cooperate with each and other so placed that when the two halves are brought together the elements are joined together. In this respect the half of the feed head bearing the expendable parts may be simply pulled off or plugged into position, this making rapid replacement possible. Since the pressure applied to the adhesive is in the low pressure range there is the advantage of its only being necessary to have a simple seal for the coupling elements, which are noted, are preferably able to be plugged into each other.

Advantageous developments and expedient further features of the invention will be gathered from the following account of one working embodiment thereof in conjunction with the drawing.

LIST OF THE VIEWS OF THE DRAWING

FIG. 2 is a block schematic of an applying device for adhesive and folding adjuvant liquid in accordance with the present invention.

DETAILED DESCRIPTION OF WORKING EXAMPLE OF THE INVENTION

Figure 1:
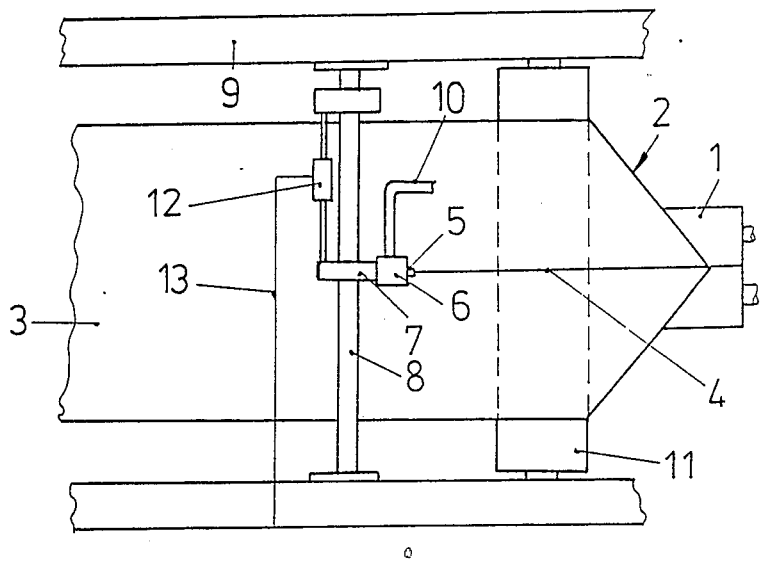
FIG. 1 is a diagrammatic plan view of a longitudinal folding device preceding a folder with the adhesive applying device in accordance with the present invention.

The longitudinal folding device shown in FIG. 1 consists of a fold funnel 2 placed over two folding rolls 1 and via with a web package consisting of a plurality of printed webs 3 is drawn off. The paper webs placed on each other are glued together by adhesive, in the present case in the vicinity of the fold line produced by the folding rolls 1 and folding funnel 2. For this purpose the paper webs under the topmost paper web have a strip 4 of adhesive applied thereto with the desired seam to be produced. As an adhesive it is particularly preferred to use a low-viscosity, non-iogenically emulsified acrylate polymer adhesive. In this respect it is a question of a dispersed adhesive with 40% of alcohol or water and about 60% adhesive. Such an adhesive has a low viscosity, that is to say its viscosity is like that of water of the order of 17 sec as measured using a 4 mm DIN beaker. The viscosity of water amounts to about 10 sec. The surface tension of the adhesive may be of the order of 30 mN/m$^2$.

The strip of adhesive is produced by a nozzle 5 without making contact. The nozzle 5 is mounted on a feed or application head 6, which is held in place by means of an associated holder 7 on a crosspiece 8, which for its part is attached to the frame side walls 9 of the superposed folder or of the printing press. The feed head 6 is supplied via supply cord 10 with medium to be applied to the respective length of paper web and with control signals. The nozzle 5 is located in the vicinity of the upward run of the respective paper web 3 moving towards the bend roll 11 arranged above the fold funnel 2, such roll keeping the web taut. Since the nozzle 5 however operates without making contact, it is not essential to have an absolutely constant position of the web 3 in relation to the cooperating nozzle 5 so that the feed head 6 may be arranged at a greater distance from the bend roll 11 than is the case in the illustrated example of the invention.

The position of the feed head 6 may be adjusted by suitable displacement of the holder 7 along the crosspiece 8. In simple cases this adjustment may be by hand. In the illustrated working example of the invention however of FIG. 1 there is a remote controlled device 12 which is operated from a control console via a control line 13. The number of feed heads 6 mounted on the crosspiece 8 is the same as the number of strips of adhesive 4 to be applied to the web 3. In the illustrated working example of the invention, as noted above, a middle strip 4 of adhesive is applied so that there is a respective middle feed head 6.

In lieu of adhesive a folding adjuvant liquid may be applied to the topmost web of a web package. The same applies for the webs 3 placed thereunder if no adhesive is to be fed onto the fold line. Since at a given position only adhesive or folding adjuvant liquid is required, the application of the adhesive or of the folding adjuvant liquid may be performed with one and the same application or feed head 6, which dependent on the specific type of operation may be supplied with adhesive, or, respectively, folding adjuvant liquid. Such a feed head is therefore, as may be best seen from FIGS. 2 and 3, connected with two parallel liquid supply pipes 14 and 15, contained in the supply cord 10, for adhesive and, respectively, folding adjuvant liquid and is provided with a fitted valve arrangement upstream from the nozzle with two control valves 16 and 17 with the aid of which the desired pipe is made operational while the other is put out of operation. The control valves 16 and 17 are operated by two control lines 18 extending in through the feed head and also contained in the supply cord 10.

The control valve 17 arranged directly upstream from the nozzle 5 may in this respect be in the form of a shut off valve, with the aid of which the strip 4 of applied liquid may be interrupted. The other control valve 16 is in the form of a multiway valve, which has one input port and two output ports, of which one is connected with the adhesive supply pipe 14 and the other is connected with the folding adjuvant liquid pipe 15. This arrangement makes possible not only a selective supply to the nozzle 5 of either adhesive or folding adjuvant liquid but also, after the termination of the application of adhesive, flushing out of the nozzle 5 with folding adjuvant liquid, which is preferably in the form of heated tap water.

The adhesive supply pipes 14 leading to the individual feed heads 6 run, as may be further seen from FIG. 2, from a distributor 50, which is connected via an adhesive main 14a with an adhesive supply tank 51. The distributor 50 is able to be operated by way of a control line 52 so that in each case only the desired feed heads 60 may be supplied with adhesive. The adhesive may be pumped off from the adhesive supply tank 51. In the illustrated working example of the invention the adhesive is forced out of the adhesive supply tank 51 by pressurizing it. For this purpose the surface of the adhesive is acted upon by air supplied from a source of such air, in the present case in the form of a compressed air supply main 53 in the plant. The compressed air reaches the tank 51 via a pressure line 54. The adhesive supply tank 51 is so constructed in the illustrated form of the invention that two respective adhesive drums may be accepted which are alternately emptied. The connection of the pressure line 54 is for this purpose able to be switched over.

Owing to the low viscosity of the adhesive the diameter of the hole for the supply of the nozzle 5 may be of the order of merely 0.5 mm. In the case of such a small nozzle orifice the conventional low pressure of approximately 1.5 bar is quite sufficient in order to supply the adhesive to the nozzle 5 and to cause it to spray out of the nozzle orifice. The adhesive pressure is in the low pressure range so that the pipes and containers do not have to be excessively robust.

The adhesive supply pipe 14a is arranged to conduct the adhesive through a filter device 55 arranged downstream from the adhesive supply tank 51. The filter device 55 comprises a filter with a mesh size of approximately 125μ. Owing to the low viscosity of the adhesive at the filter device 55 there will be no excessive drop in pressure if the design is a compact one. The filter of the filter device 55 may be made of stainless steel. The ratio between the size of the mesh and the diameter of the nozzle is of the order of 1 to 4 and ensures a long period of operation without stoppages.

The moistening adjuvant pipes 15 also extend from a distributor 56, which may be controlled by a control line 57. The distributor 56 is connected via a folding adjuvant liquid manifold line 15a with a suitable source of liquid, which in the present case is in the form of a water supply main 58. The tap water which in the present case is used as folding adjuvant liquid is heated to be above room temperature. For this purpose there is a continuous flow water heater 59 in the manifold line 15a. In many cases chemical additives may be put in the water. For this purpose the continuous flow water heater 59 is supplied via a mixing device 60.

The folding adjuvant liquid may be used not only for flushing of the nozzles 5 but also for flushing out the entire adhesive applying system. For this purpose the adhesive manifold pipe 14a, and folding adjuvant liquid supply pipe 15a are connected with each other by means of a bypass pipe 61, which branches downstream from the water heater 59 from the folding adjuvant liquid manifold pipe 15a and opens into the adhesive manifold pipe 14a adjacent to the outlet port adhesive supply tank 51. At the point of branching of the bypass 61 from the folding adjuvant liquid manifold pipe 15a there is a remote controlled multiway valve 62, which makes possible an alternative water circuit via the folding adjuvant liquid system or the adhesive system, respectively. In order to prevent undesired supply of water to the adhesive supply tank 51 or of adhesive into the adhesive folding adjuvant liquid system there are respective check valves 63 placed upstream from the opening of the bypass 61 into the adhesive manifold pipe 14a on both sides. By flushing out the entire adhesive applying system with heated water it is possible to reliably avoid the build up of deposits, which might otherwise be formed if the equipment is allowed to stand still for prolonged periods of time.

For short idle periods it is generally sufficient, to avoid irregularities in operation, to flush out the feed heads 6. For this purpose the bypass 61 is inactivated and the valve arrangement provided in each feed head 6 is so operated that on turning off the web feed the supply of adhesive from all feed heads 6 is interrupted and the folding adjuvant liquid supply is opened. This flushing of the feed heads 6 and of the entire adhesive applying system may be started as soon as the web speed has sunk to below a third of the normal web speed, since when printing has ceased the web is in any case only waste. The control valves 16 and 17 may for this purpose be operated from a computer, which processes data relating to the general control of the machine and the monitoring thereof.

Figure 3:
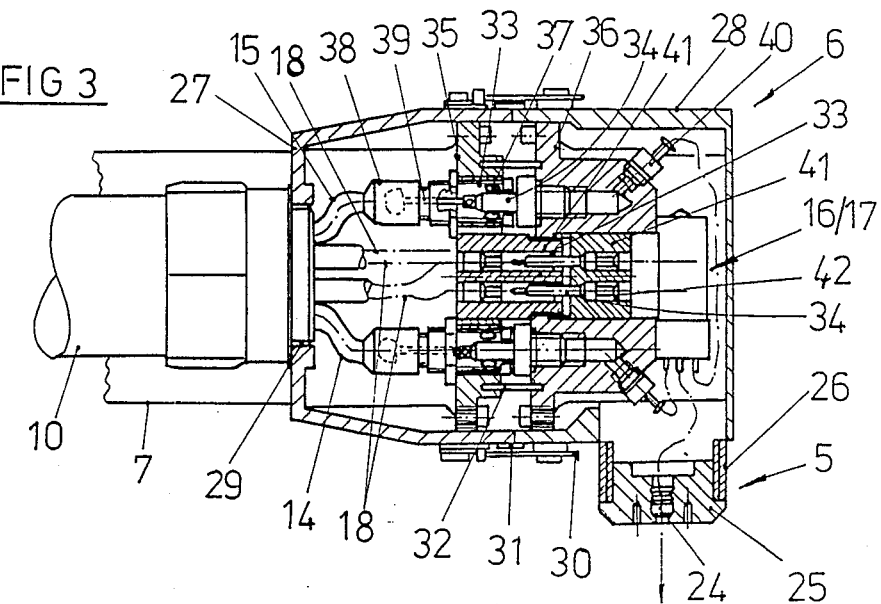
FIG. 3 is a section taken through the feed head in accordance with the present invention.

The nozzles 5, as may best be seen from FIG. 3, are in the form of non-return spraying nozzles with a central nozzle hole 24 having an initial diameter of 0.5 mm in the nozzle body 25, which is screwed into a nozzle base 26 of the feed head 6 and which is connected to expendable parts in the form of the control valve 16 and 17 of the valve arrangement associated with each nozzle 5. The life of such expendable parts is limited and they have to be replaced from time to time. In order to facilitate such replacement, the housing of each feed head 6, as may also be seen from FIG. 3, consists of two shell-like halves 27 and 28, which are able to be detachably plugged together. The one half 27 is in this respect arranged in a stationary manner, that is to say fixed to the holder 7. The supply cord 10 leads to the half 27, fixed to the holder 7, of the feed head 6, such half 27 is provided with a suitable access hole 29, in which the end of the casing of the supply cord 10 may be screwed. The expendable parts in the form of the nozzle 5 and the valve arrangement with the control valves 16 and 17 are located on the other half 28 of the feed head 6, which is able to be slipped over the stationary half 27. In the event of replacement of an expendable part being required, it is only necessary simply to pull off the half 28 and replace it by a new one.

The two halves 27 and 28 of the feed head 6 are able to be clamped together by means of clamps 30 arranged on opposite sides thereof. The clamps may be in the form of toggle levers, which are pivoted beyond there dead center positions so that there is an automatic locking effect. At the parting plane between the two halves it is possible to have a surrounding collar 31 to keep out dust. In order to ensure that the moving half 28 is always plugged on in the correct position onto the stationary half 27, it is possible to have one or more asymmetrically arranged locating pins 32 spanning the parting plane.

The supply cord 10 extending into the stationary half 27 comprises both the liquid supply pipes 14 and 15 and also the control lines 18. All the lines and pipes extend past the parting plane between the two halves 27 and 28 of the feed head 6. In order nevetheless to make it readily possible for the moving half 28 to be removed, at the parting plane the lines and pipes are interrupted and joined together by means of plug connections. The plug connections on the liquid pipes 14 and 15 are in the form of liquid couplings, while the plug connections for the control liens 18 are in the form of electrical couplings. In both cases the plug couplings each consist of female parts 33 arranged on the one half 27 and respective male pins 34 on the other half 28, which when the movable half 28 is placed on the stationary half 27 are automatically connected with the respective female parts 33. The female parts 33 and the male parts 34 are arranged parallel to the direction of plugging together like the locating pins 32, that is to say perpendicular to the parting plane. The coupling parts in the form of the female elements 33 and the male ones 34 are attached to support plates 35 and, respectively 36 placed parallel to the parting plane. Such support plates are mounted like covers in the respectively trough-like half 27 and 28, respectively, of the feed head 6. In the illustrated working example of the invention the support plates 35 and, respectively, 36 are in the cavity of the respective half 27 and 28 of the feed head 6 and are screwed thereto.

The male pins 34 of the liquid couplings are in the form of hollow pins in the illustrated working example of the invention, which fit with play into the respectively associated female parts 33. The radial clearance is then spanned by an O-ring 37. Each of the female parts 33 arranged on the stationary half 27 of the liquid couplings is fed through a check valve 38, whose valve element is held in the open state by a pin 34 fitting into the respective female part 33. For this reason the pins 34 of the liquid couplings are provided with a plunger 39 extending into the upstream check valve 38 in the engaged state. In order to facilitate attachment of the plungers 39, the respective hollow pins are provided with a radial inlet hole. The plungers 39 ensure that on pulling off the moving half 28 the liquid pipes 14 and, respectively, 15 are automatically shut so that no liquid is lost.

The female parts 33 of the liquid couplings are in the form of nipples screwed into through holes in the associated support plate 35, the upstream check valves 38 being mounted thereon. The pins 34 of the liquid couplings are also provided with threaded nipples, which in the present case is screwed into a respective blind hole in the support plate 36. A connecting hole extends from the blind holes and has a connection nipple 40 screwed into it, which in the present case is connected via an upstream section of the liquid supply line 14, and respectively, 15 with the control valve 16, as is indicated in FIG. 2 by broken lines.

The female parts 33 of the electrical couplings on the control lines 18 are mounted in a support 41 consisting of insulating material and are wired with the associated controls, as is indicated by the terminals 42. The same applies for the male pins 34 of the electrical couplings. The electrical couplings are arranged in the middle between the liquid couplings so that all female parts 33 and the pins 34 associated with all the control lines 18 may be mounted on the common insulating carrier 41. The control valves 16 and 17, respectively, which are wired with the pins of the electrical couplings, may be attached in the backside of the associated support plate 36 in the part between the connecting nipples 40.

We claim:

1. A method for joining at least two paper webs or running lengths of material in a printing press together by means of at least one strip of adhesive, comprising the steps of:

providing an adhesive having a viscosity ratio with that of water in the range of 1.5 to 2;
applying a low pressure to the adhesive;
filtering the adhesive prior to application to a web;
applying at least one strip of adhesive to at least one of the webs through a nozzle; and
changing over the nozzle from adhesive application to folding adjuvant liquid application for flusing the nozzle after turning off the press but before halting the web.

2. The method as claimed in claim 1 wherein said ratio is approximately equal to 17 to 10.

3. The method as claimed in claim 1 wherein the adhesive is a dispersion adhesive with a solids content of 40% to 70%, a surface tension of 25 mN/m$^2$ and a viscosity measured with a DIN 4 mm beaker equal to 15 sec to 20 sec.

4. The method as claimed in claim 1 wherein the adhesive is pressurized at about 1.5 bar.

5. The method as claimed in claim 1 wherein the adhesive is filtered thorough a screen with a mesh size of approximately 125μ.

6. The method as claimed in claim 1 wherein the adhesive is sprayed on to the web using a contact-free nozzle.

7. The method as claimed in claim 1 wherein the width ratio between the mesh of the filter and the nozzle orifice is substantially 1 to 4.

8. The method as claimed in claim 1 wherein the adhesive is sprayed on using a nozzle with a nozzle orifice of approximately 0.5 mm.

9. The method as claimed in claim 1 wherein as an alternative to adhesive a folding adjuvant liquid is applied.

10. The method as claimed in claim 1 wherein the adhesive is a dispersion adhesive with a solids content of approximately 50% to 60%, a surface tension of 30 mN/m$^2$, and a viscosity measured with a DIN 4 mm beaker equal to 15 sec to 20 sec.

11. The method as claimed in claim 9 wherein said adjuvant liquid is heated water and said web is one of plurality of superposed webs not requiring the application of adhesive.

12. The method as claimed in claim 1 wherein said adjuvant liquid is in the form of heated water.

* * * * *